Figure 5:
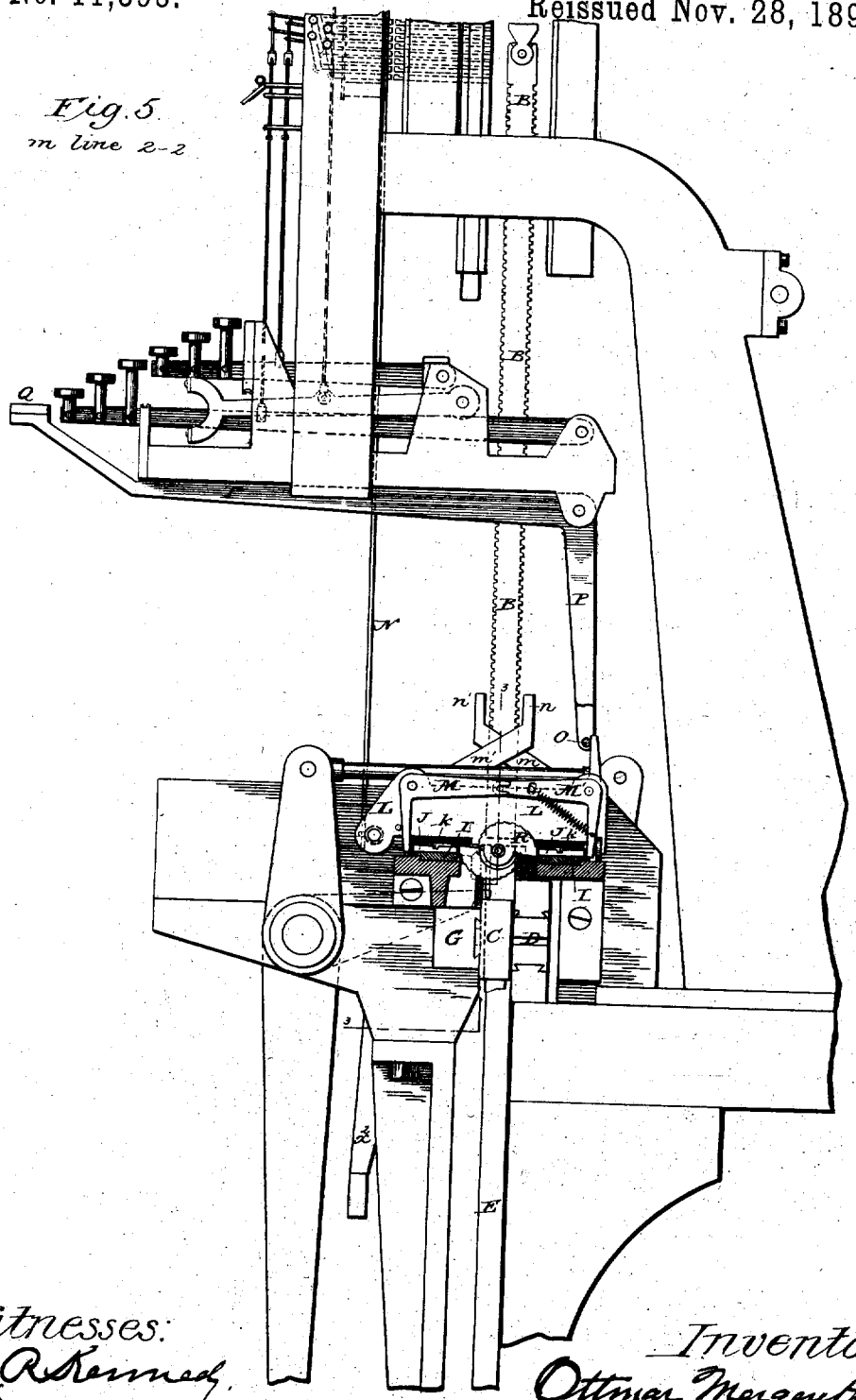

10 Sheets—Sheet 1.
O. MERGENTHALER.
MACHINE FOR PRODUCING TYPE BARS AND MATRICES THEREFOR.
No. 11,393. Reissued Nov. 28, 1893.
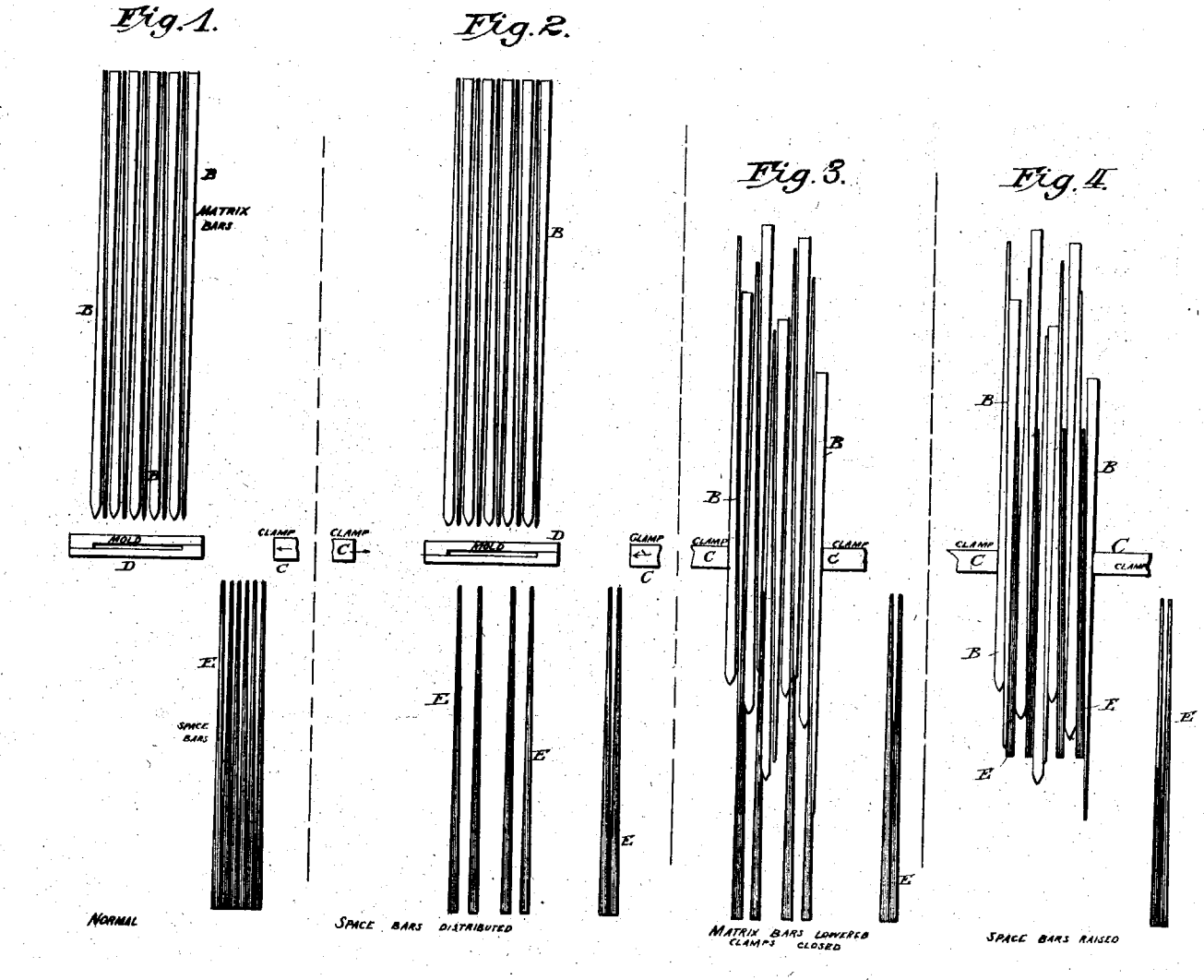
Witnesses:
N. R. Kennedy
F. S. Elmore
Inventor:
Ottmar Mergenthaler
By Philip T. Dodge
Atty.

O. MERGENTHALER.

MACHINE FOR PRODUCING TYPE BARS AND MATRICES THEREFOR.

No. 11,393. Reissued Nov. 28, 1893.

in line 2-2

Witnesses:
W. R. Kennedy,
F. S. Elmore.

Inventor:
Ottmar Mergenthaler
By Philip T. Dodge
Atty.

10 Sheets—Sheet 3.

O. MERGENTHALER.

MACHINE FOR PRODUCING TYPE BARS AND MATRICES THEREFOR.

No. 11,393. Reissued Nov. 28, 1893.

Witnesses:
M. R. Kennedy,
F. S. Elmore

Inventor:
Ottmar Mergenthaler
By Philip T. Dodge
Atty.

10 Sheets—Sheet 4.

O. MERGENTHALER.

MACHINE FOR PRODUCING TYPE BARS AND MATRICES THEREFOR.

No. 11,393. Reissued Nov. 28, 1893.

Witnesses:
W. R. Kennedy.
F. S. Elmore.

Inventor:
Ottmar Mergenthaler
By Philip T. Dodge
Atty.

O. MERGENTHALER.

MACHINE FOR PRODUCING TYPE BARS AND MATRICES THEREFOR.

No. 11,393. Reissued Nov. 28, 1893.

Witnesses:
M. R. Kennedy
F. S. Elmore

Inventor:
Ottmar Mergenthaler
By P. T. Dodge
Atty.

O. MERGENTHALER.

MACHINE FOR PRODUCING TYPE BARS AND MATRICES THEREFOR.

No. 11,393. Reissued Nov. 28, 1893.

Witnesses:
W. R. Kennedy
F. A. Egmore

Inventor:
Ottmar Mergenthaler
By Philip T. Dodge
Atty

O. MERGENTHALER.

MACHINE FOR PRODUCING TYPE BARS AND MATRICES THEREFOR.

No. 11,393. Reissued Nov. 28, 1893.

Witnesses:
M. R. Kennedy
F. S. Elmore.

Inventor:
Ottmar Mergenthaler
By Philip T. Dodge
Atty.

10 Sheets—Sheet 8.

O. MERGENTHALER.

MACHINE FOR PRODUCING TYPE BARS AND MATRICES THEREFOR.

No. 11,393. Reissued Nov. 28, 1893.

on line 1-1 on line 5-5 on line 5-5

Witnesses:
N. R. Kennedy
F. S. Connor

Inventor:
Ottmar Mergenthaler
By Philip T. Dodge
Atty.

O. MERGENTHALER.
MACHINE FOR PRODUCING TYPE BARS AND MATRICES THEREFOR.
No. 11,393. Reissued Nov. 28, 1893.
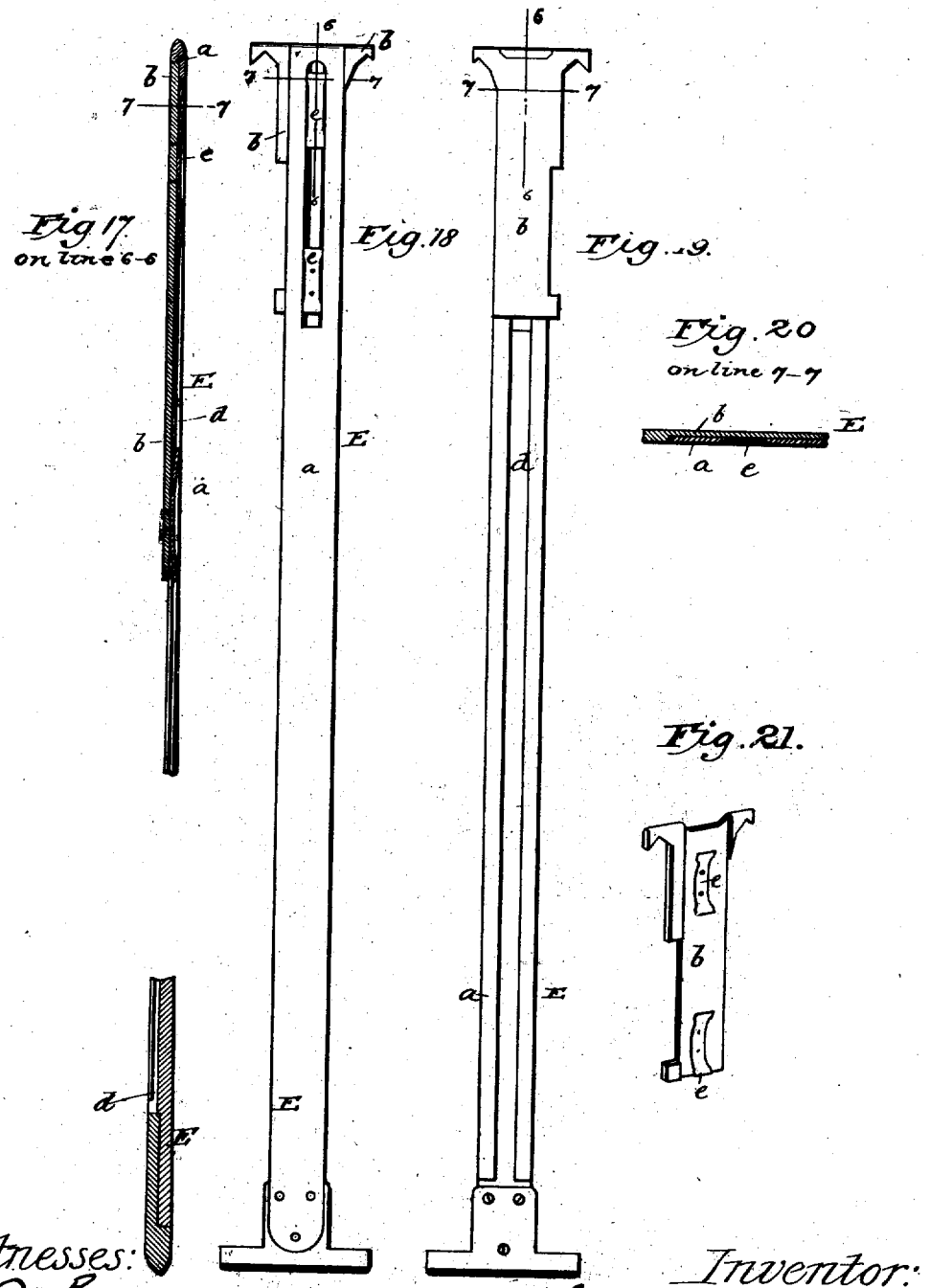
Witnesses:
N. R. Kennedy.
F. S. Elmore.
Inventor:
Ottmar Mergenthaler
By Philip T. Dodge
Atty.

O. MERGENTHALER.
MACHINE FOR PRODUCING TYPE BARS AND MATRICES THEREFOR.
No. 11,393. Reissued Nov. 28, 1893.
Fig. 26
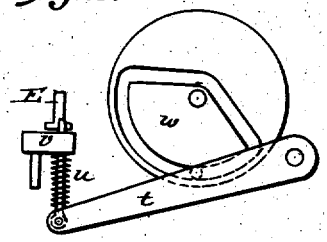
Fig. 22.
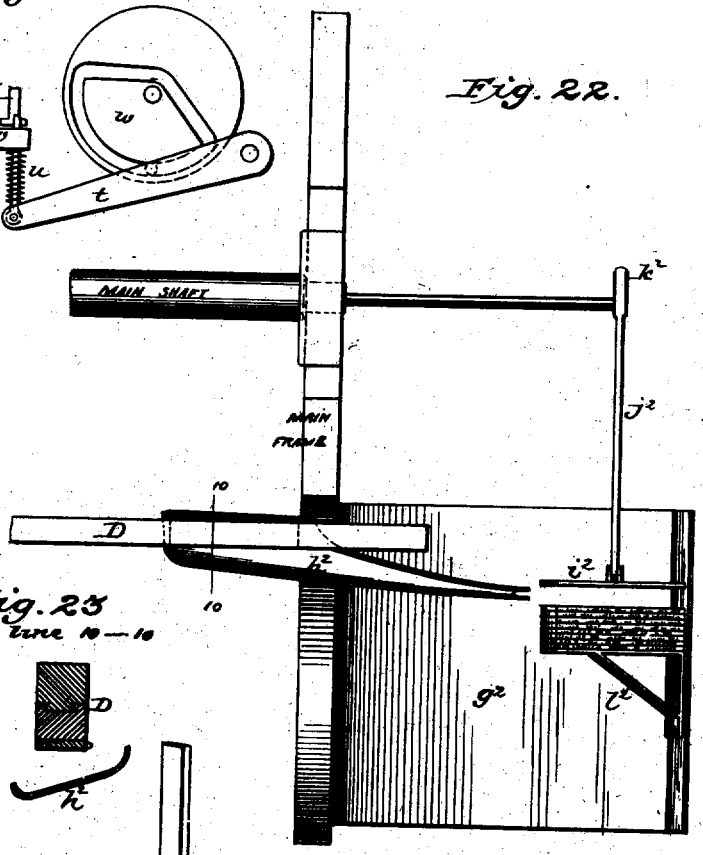
Fig. 23
on line 10—10
Fig. 24.
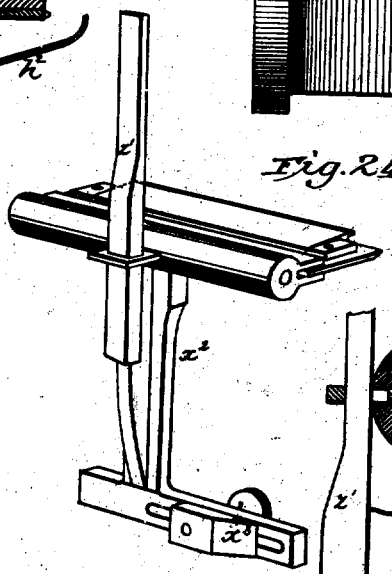
Fig. 25.
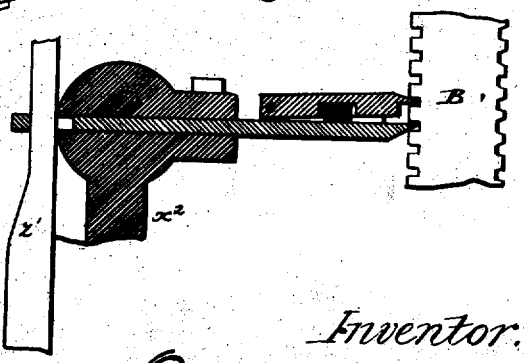
Witnesses:
W. R. Kennedy
G. S. Elmore
Inventor:
Ottmar Mergenthaler
By Philip T. Dodge
Atty.

UNITED STATES PATENT OFFICE.

OTTMAR MERGENTHALER, OF BALTIMORE, MARYLAND, ASSIGNOR, BY MESNE ASSIGNMENTS, TO THE MERGENTHALER LINOTYPE COMPANY, OF NEW JERSEY.

MACHINE FOR PRODUCING TYPE-BARS AND MATRICES THEREFOR.

SPECIFICATION forming part of Reissued Letters Patent No. 11,393, dated November 28, 1893.

Original No. 345,525, dated July 13, 1886. Application for reissue filed August 10, 1893. Serial No. 482,872.

*To all whom it may concern:*

Be it known that I, OTTMAR MERGENTHALER, of Baltimore, in the State of Maryland, have invented certain new and useful Improvements in Machines for Producing Type-Bars and Matrices for Type-Bars, &c., of which the following is a specification.

This invention relates to those machines in which, through the medium of finger-keys, types or dies having individual letters or characters thereon or therein are assembled temporarily in line either to form matrix-impressions from which to cast printing-bars or to co-operate directly with a mold in which the bars are formed. In operating such machines, whatever their form, it is found, as in type-setting by hand, impossible to determine in advance the spacing required between words in order to have the characters fill out the space allotted for the line, and this not only because of the varying width of the characters, but because of the necessity of following the accepted rules as to the division of words, &c.

It is the particular aim of this invention to provide an automatic mechanism by which a proper and uniform spacing or justification may be instantly effected after the designated characters are assembled in line.

To this end it consists in the peculiar construction and arrangement of mechanism herein described for distributing, inserting properly between the aligned matrices, and simultaneously operating a series of expansible space-bars which act to elongate or justify the line to a predetermined limit. The space-bars consist each of two wedge-like portions tapered in opposite directions.

I do not claim, broadly, a space-bar consisting of two tapered members, nor the particular matters covered by application Serial No. 181,576, filed November 2, 1885.

In the accompanying drawings I have shown my invention applied to the machine for casting type-bars set forth in Letters-Patent of the United States granted to me on the 3d day of March, 1885, No. 313,224, in which a series of parallel reciprocating bars, each provided in the edge with a series of intaglio characters, co-operate directly with a mold, closing its side in such manner as to produce type on the edge of the bar formed in the mold. It is to be understood, however, that the improvement is also applicable to a machine having cameo characters on the bars for producing stereotype-matrices, as represented in Letters-Patent of the United States, dated February 10, 1885, No. 312,145, and generally to any and all machines in which dies, types, or matrices representing letters, characters, or symbols are temporarily assembled in line to produce impressions in or characters upon any material whatever.

A second part of my invention, relating more particularly to machines in which the direct casting operation is performed, has reference to a device for confining the parts or sections of the mold during the casting operation and subsequently releasing them that the mold may be opened for the discharge of the casting.

A third feature of the invention relating to the same class of machines consists in peculiar devices to assemble the printing-bars or type-bars automatically in regular order as they are delivered from the machine.

In the drawings I have represented a machine the principal parts of which are identical or substantially identical with those described in Letters-Patent of the United States, No. 313,224, before alluded to, to which patent reference may be had for a detailed description of those parts not described herein.

In order that the details of the mechanism may be more readily understood I have represented in the drawings and will first describe, diagrams illustrating in a general way the relative arrangements of the matrix-bars and space-bars, and the manner in which the latter are adjusted and inserted between the former.

Figure 6:
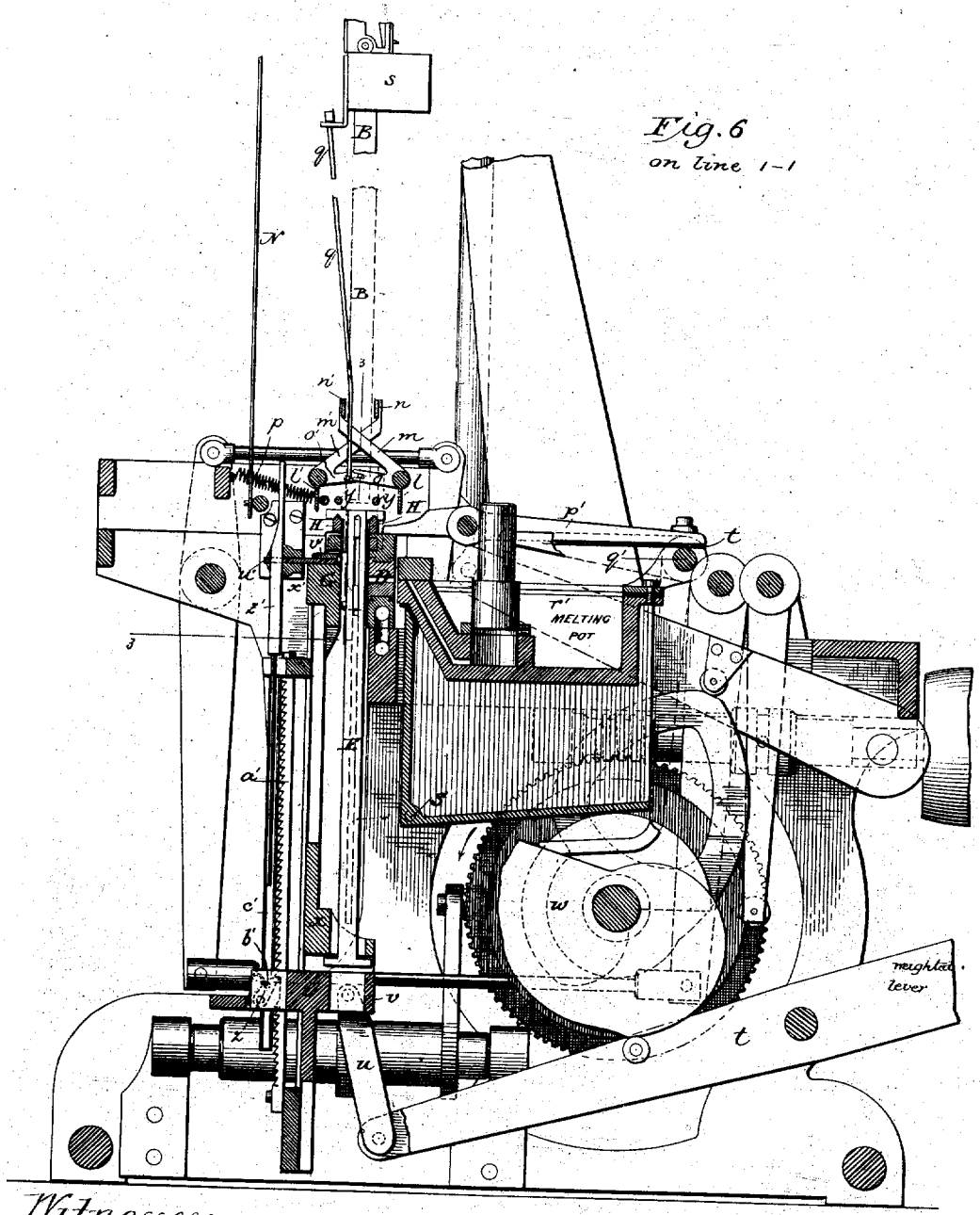
Figure 7:
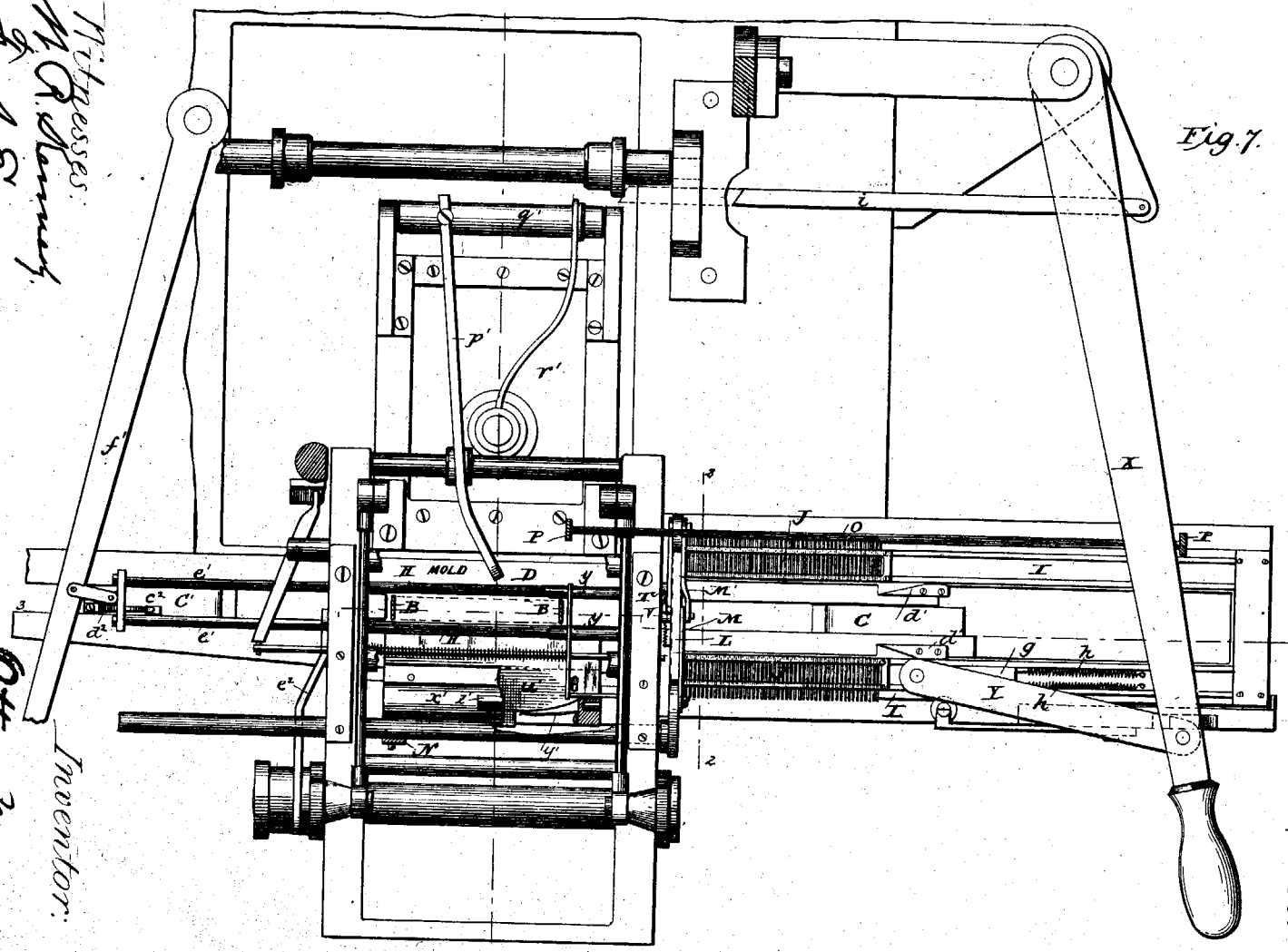
Figure 8:
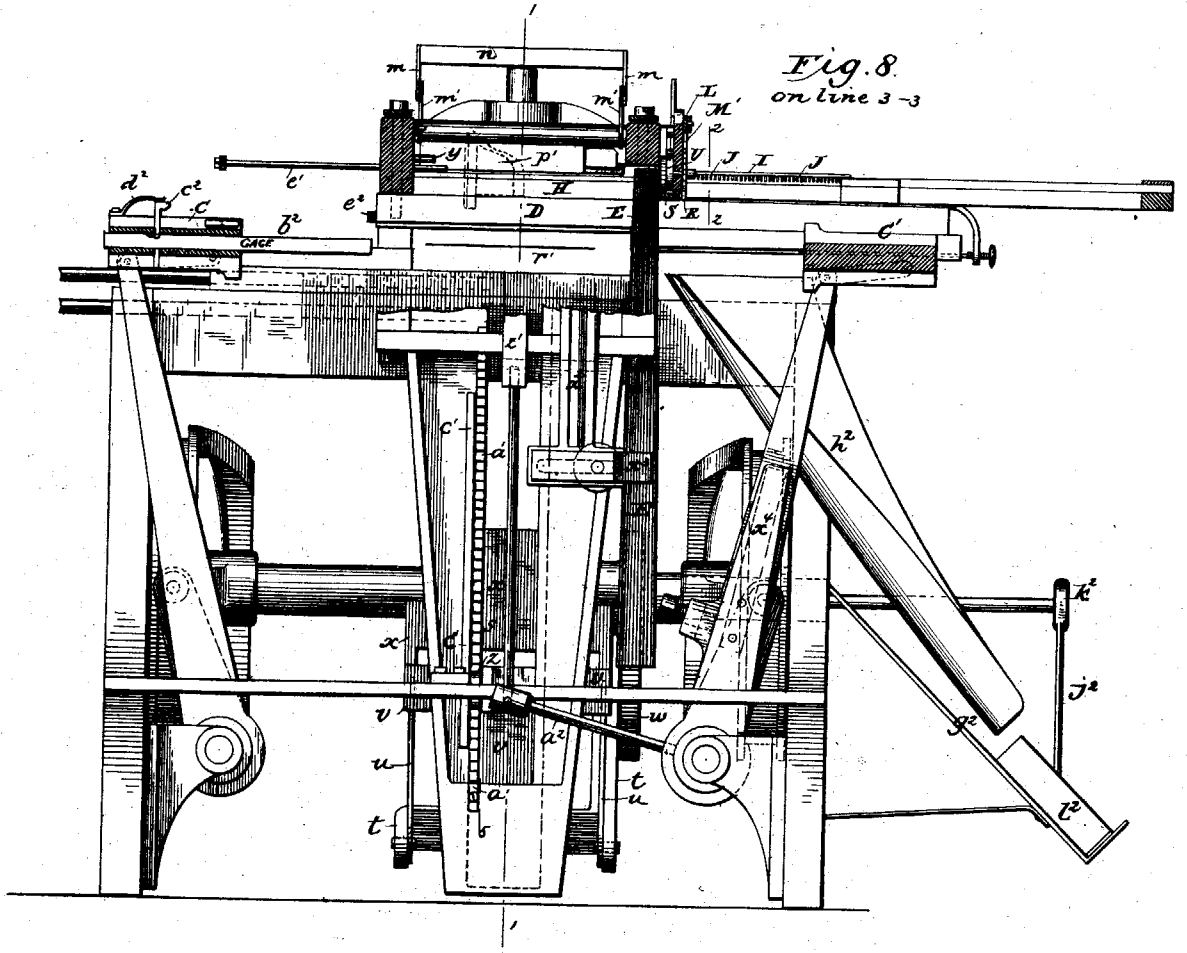
Figure 9:
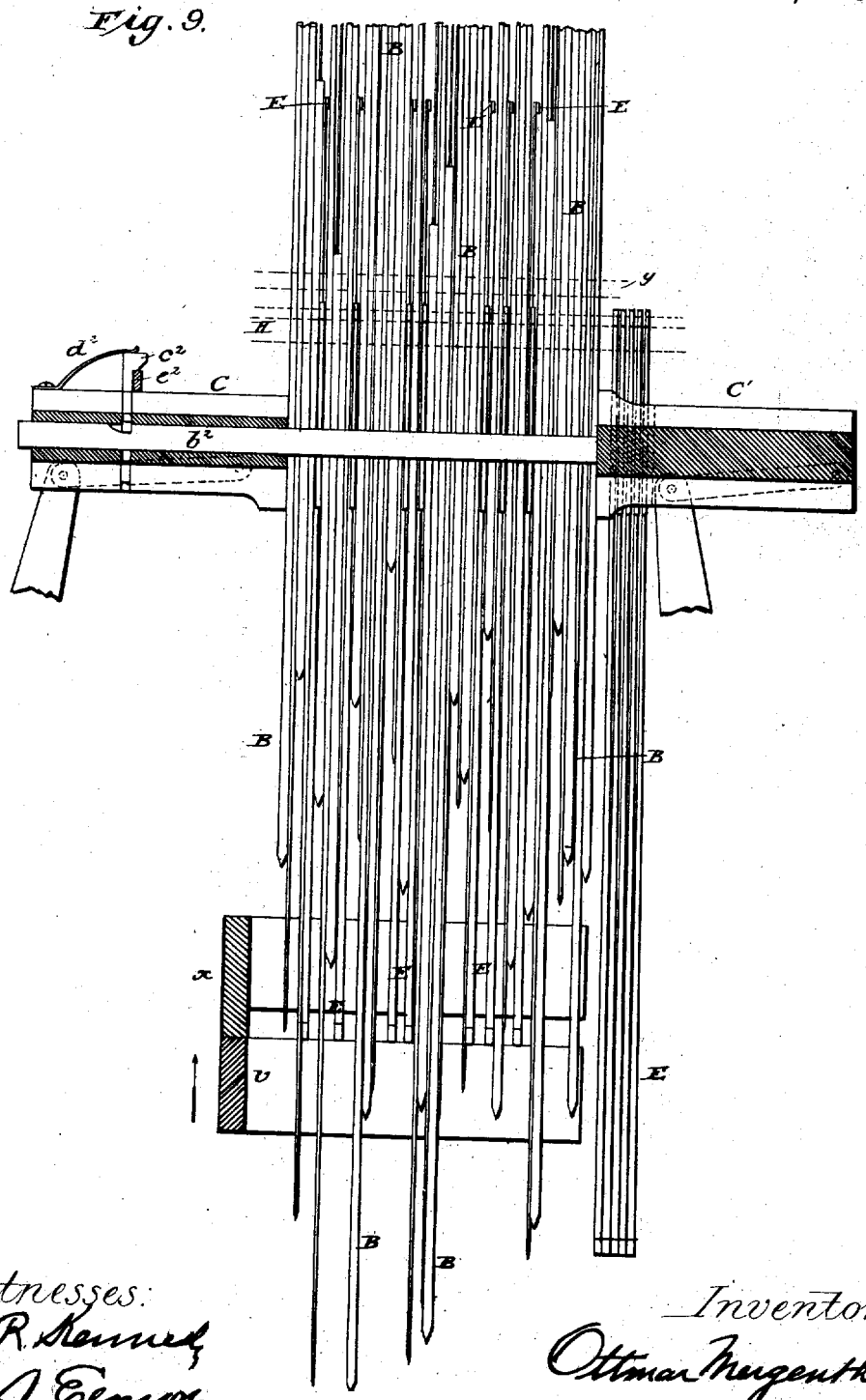
Figure 10:
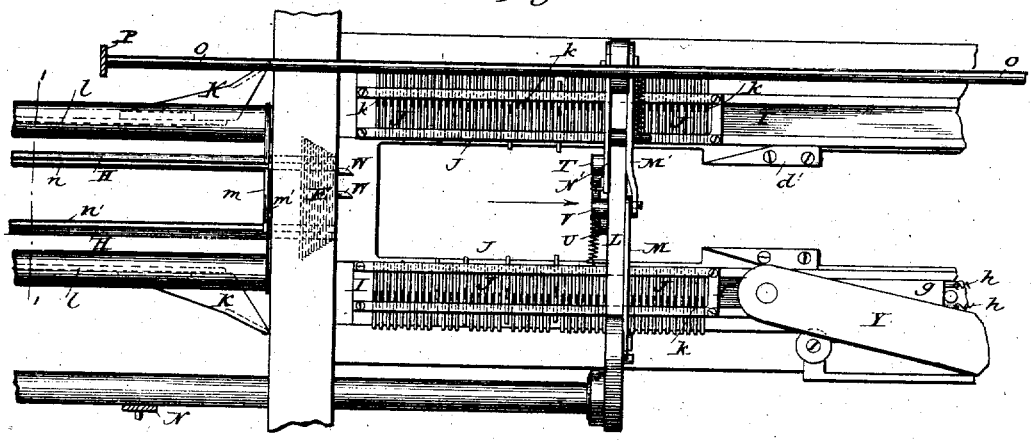
Figure 11:
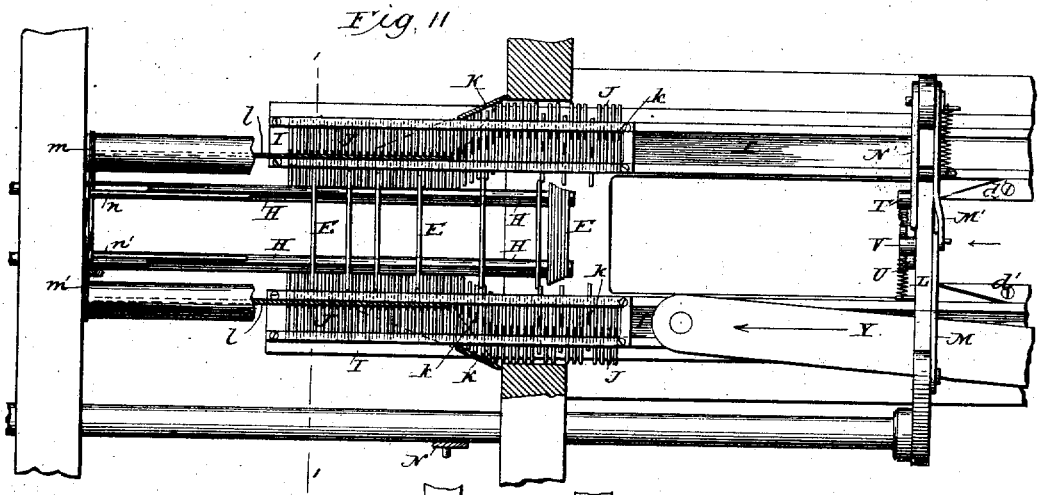
Figure 12:
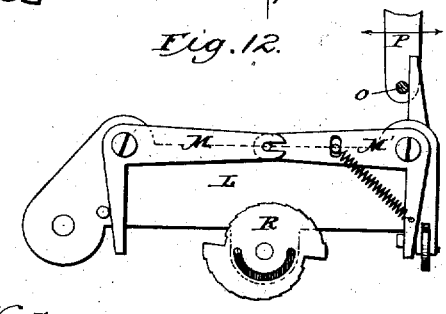
Figure 13:
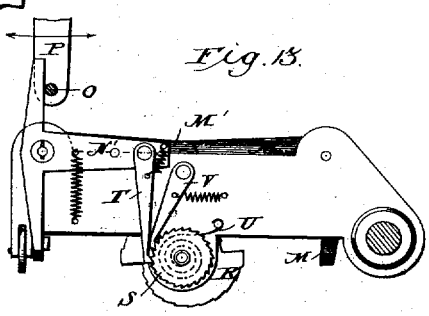
Figure 14:
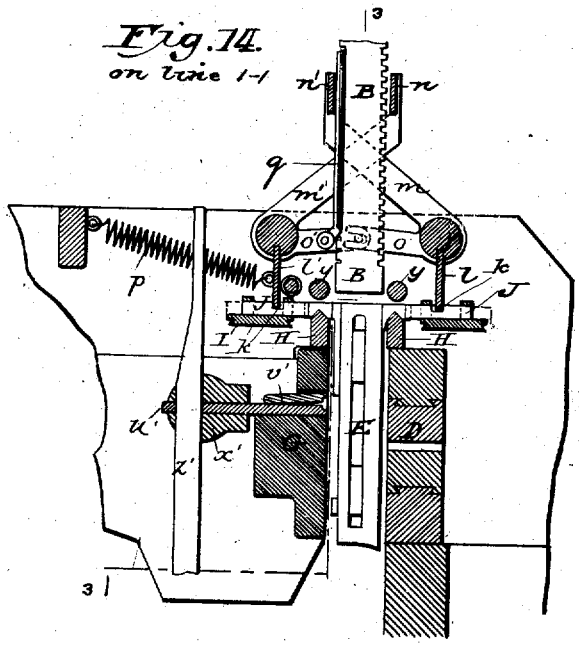
Figure 15:
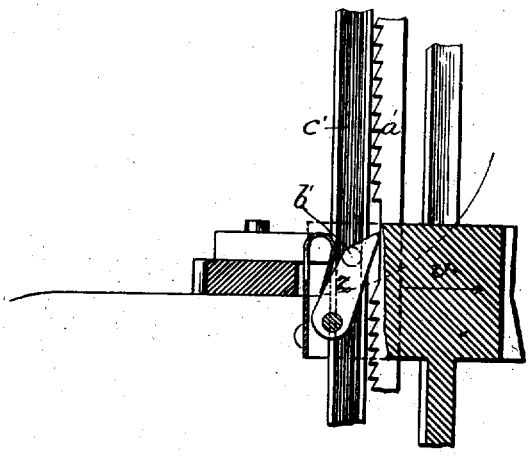
Figure 16:
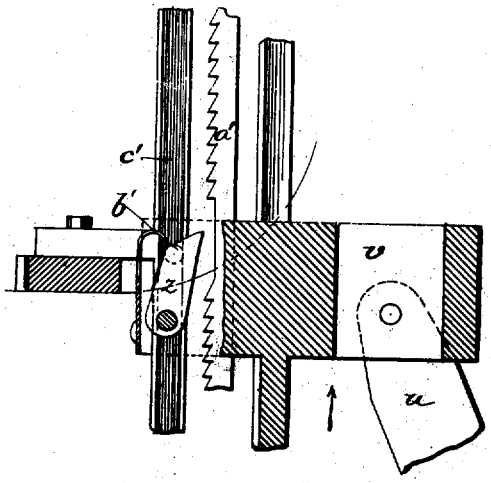

Figs. 1, 2, 3, and 4 are the diagrams above referred to. Fig. 5 is a side elevation of the main portions of the machine, the parts being represented in vertical section on the line 2—2 of Fig. 7. Fig. 6 is a vertical central section through the main portion of the machine from front to rear on the line 1—1 of Fig. 7. Fig. 7 is a top plan view of the base portion of the machine, all parts above the casting mechanism, including the type-bars and key-board, being removed to expose the parts located thereunder. Fig. 8 is a front elevation of the base portion of the machine, the parts adjacent to the casting mechanism being represented in vertical section on the line 3 3 of Figs. 5, 6, and 7. Fig. 9 is a front elevation of the matrix-bars and space-bars as they appear after the justification of the line, the parts being in position for the casting operation, together with a sectional representation of the clamps by which the bars are confined laterally, and the bar for gaging or determining the length of the line. Fig. 10 is a top plan view showing the devices for transferring and supporting the spacing-bars, together with various attendant parts. Fig. 11 is a similar view of the parts as they appear at an intermediate stage in the distribution of the spacing-bars. Fig. 12 is an end elevation of the sliding head and the levers thereon for adjusting the slides which effect the distribution of the space-bars. Fig. 13 is an elevation, looking against the opposite end of said frame, showing the mechanism for determining the adjustment of the respective slides by which the distribution of the space-bars is secured. Fig. 14 is a vertical section through the middle of the machine from front to rear on the line 1 1 of Figs. 7, 8, 10, and 11, showing more particularly the space-bars and their attendant parts. Figs. 15 and 16 are vertical sections on the line 5 5 of Fig. 8 showing the pawl and attendant devices for controlling the movement of the weight by which the space-bars are forced between the matrix-bars. Fig. 17 is a vertical cross-section through the upper end of one of the space-bars. Figs. 18 and 19 are views of opposite sides of the space-bar. Fig. 20 is a transverse section on the line 7 7 of Figs. 18 and 19. Fig. 21 is a perspective view of the head through which the body of the space-bar slides. Fig. 22 is a top plan view illustrating the device for assembling the type-bars as they are delivered from the machine. Fig. 23 is a vertical cross-section of the same on the line 10 10. Fig. 24 is a perspective view of the improved aligning device. Fig. 25 is a cross-section of the same. Fig. 26 is a view illustrating the manner in which the controlling-cam may be applied in place of the weight to impart a positive motion to the device by which the space-bars are advanced.

Referring to Figs. 1 to 5, B B represent the matrix-bars suspended side by side, each bar provided at its edge with a series of characters, and arranged to descend independently of the others, so that either of its characters may be brought to the aligning-point, as in the original machine.

C C are the laterally-acting clamps, between which the matrix-bars are confined when in action, and by which the length of the line is in part determined.

D is the mold in which the printing-bars are formed, having its open side presented toward the matrix-bars, so that the selected and aligned characters on the latter will temporarily close its side.

E E represent the tapered space-bars to which the present invention relates.

In the normal position of the parts the matrix-bars are suspended at uniform heights, with their lower ends above the mold and above the tops of the space-bars, which latter hang with their narrow ends uppermost, side by side, in a compact group at one side of the machine, out of the path of the matrix-bars. After the letters or characters to appear in the line and the places for the intermediate spaces in the line have been determined by the operation of the finger-keys, as usual, and while the matrix-bars are still in their elevated positions the space-bars are shifted laterally beneath the matrix-bars, as shown in Fig. 2, and distributed thereunder, so that each space-bar stands below a point at which a space is to occur in the line. After this distribution of the space-bars the matrix-bars descend, as usual, to bring their selected characters to the aligning-point opposite the mold, and in so doing they pass between the space-bars, as shown in Fig. 3. To facilitate this entrance of the matrix-bars those having the wide ends are beveled or pointed, as shown. After the matrix-bars have reached their operative positions the space-bars are forced upward positively, simultaneously, and equally, whereby they are caused to force the matrix-bars apart laterally until they fill out the space allotted for the line, at the same time separating the matrix-bars between the terminal letters of words, so as to produce uniform spacing throughout the line. The parts thus remain until after the casting operation is completed when they assume their original positions.

Having thus explained the general nature of my justifying mechanism, I will now explain in detail the construction of the space-bars and of the devices by which they are justified and operated, premising that all parts of the machine, except the justifying mechanism and other parts hereinafter specified, are constructed and arranged to operate in the manner set forth in Patent No. 313,224.

Referring more particularly to Figs. 5, 6, 7, 8, and 9, D represents the horizontal mold, and G the horizontal clamp, which acts on the rear or blank edges of the matrix-bars when they are lowered between the clamp and mold, for the purpose of forcing them against the latter. Above the clamp and mold, on opposite sides of the space into which the matrix-bars descend, I place two horizontal parallel rails, H, which are extended at one end beyond the path of the said bars. On and between these rails I suspend a series of space-bars, E, so that they may be moved laterally. Viewed from the side, each of these bars is of an I form, as seen in Figs. 18 and 19, but viewed from the edge it is of a tapered or wedge-like form, the thin end being uppermost. Each bar has its tapered body portion *a* made in a separate piece from its T-shaped head *b*, and connected thereto by studs or lips *e*, on the head, entering an undercut or dove-tailed groove *d*, in the body, as in Figs. 17 to 20, so that the body portion may be pushed upward between the matrix-bars while the head remains upon the supporting rails II. A projection on the side of the body limits its descent and holds it commonly in suspension from the head, as seen in Figs. 17 and 19. The head diminishes laterally in thickness from the lower to the upper end, or, in other words, tapers in the opposite direction from the body, in consequence of which the outer face of the head and the outer face of the body are at all times parallel. This construction avoids the inclination or deviation from the vertical on the part of the matrix-bars which would result from the thrusting of the tapered space-bars between them.

The head and body of my bar, tapered in opposite directions and arranged to slide one upon the other, as described, constitute jointly an expansible spacing device, the operative portion of which is always of uniform thickness from top to bottom. The lower end of the bar, which may be made separate and attached rigidly to the body, as shown, or made integral with the body is widened edgewise in order to co-operate with the devices for raising and lowering the body, as hereinafter explained. The series of space-bars hang normally in their lowermost positions crowded closely together at the ends of the rails H, as in Figs. 1, 8, and 11. The several bars have their heads made of different widths, and are arranged in the order of such width, the widest at the side nearest the matrix-bars, as plainly shown in Fig. 11.

In order to move the space-bars laterally and adjust them beneath the matrix-bars, as before explained, I provide a horizontally-sliding frame, I, adapted to move on suitable guides beyond the sides of the main frame, and in this sliding frame I mount two rows of horizontal transverse slides, J, the inner ends of those in one row standing opposite those in the other row, but normally at such distance apart that they may be carried freely past the heads of the space-bars. These slides are designed, however, to be moved inward, (such of them as circumstances may require,) so that they will, when carried to the left by the movement of the frame I, engage the heads of the space-bars, and carry the latter before them along the rails and beneath the matrix-bars.

To the end that the space-bars may be moved singly and to different points, the opposing slides are moved inward toward each other different distances, the first pair called into use remaining at such distance apart that they will pass the heads of the narrower bars and engage only the last bar having the widest head, the next pair of slides being adjusted to engage only the second bar, and so on successively.

The variation in the approximation of the different slides is plainly shown in Fig. 10, and their action on the successive space-bars is represented in Fig. 11.

During the transfer of the space-bars by the slides, and during the descent of the matrix-bars after the space-bars are in position, it is desirable to lock the space-bars from turning or twisting on the rails. This is accomplished by thrusting all the slides inward to their limit of movement, after they have engaged the space-bars, so that the head of each bar will be embraced between two slides on the forward side and two on the rear side, as seen in Fig. 11. This final inward movement of the slides is effected by means of inclined plates K, attached, as shown in Figs. 10 and 11, to plates *l*, herein described, which act against the outer ends of the slides as they are carried to the left by the movement of the supporting frame I.

The first inward movement of the slides—that is to say, their adjustment to act upon the respective space-bars—is secured by means of mechanism connected with a finger-key and with the stop mechanism by which the matrix-bars are controlled in their descent. This mechanism I will now describe, reference being had particularly to Figs. 5, 7, 8, 10, 11, 12, and 13. Overlying the frame which carries the slides there is a transverse bar or head, L, arranged to slide on suitable guides in the same direction that the frame slides, but wholly independent thereof. Pivoted to the side of the head L are two elbow-levers, M and M′, the inner ends of which are jointed together, while the outer ends extend downward opposite the outer ends of the slides J, so that whenever the inner ends of the lever are raised their lower ends will act upon the slides opposite which they chance at the moment to stand, and urge said slides inward in position to engage the space-bars, as before explained. The sliding motion of the head from right to left admits of the levers being brought into position to act upon the successive slides throughout the series. The sliding head is connected, as hereinafter more fully described, by a rigid arm, N, or in any other appropriate manner, as in Figs. 5 and 7, with the adjusting pin frame of the original machine, which frame, it will be remembered, moves to the right step by step as the successive finger-keys are actuated to designate the characters and spaces. Owing to the connection between them the head L partakes of this movement, so that as the successive keys are operated to set the stop devices for the successive matrix-bars, the letters M will be presented in position to operate on the successive slides, J, the pairs of which latter should equal in number the matrix-bars in the machine. The movement of the levers M and M′ to set the slides inward is effected by means of a rod, O, carried by the lower end of an angular lever or levers, P, which is pivoted to the main frame, and the upper end of which, adjacent to the keyboard, is provided with a finger-key or bar, Q, so that every depression of the finger-key will be followed by the inward movement of a pair of slides J.

In order to control the approximation of the different slides for the purpose before explained, I mount centrally on the sliding head L, in such position as to be carried thereby between the inner ends of the slides, a disk or wheel, R, having its periphery composed of two eccentric portions divided into short stops or shoulders, as shown in Fig. 12. When the levers act upon the first pair of slides—that is to say, those at the left of the series—the eccentric wheel stands in the position shown in Fig. 5, with its outermost portions opposite the slides, so that the inward movement of the latter is limited by their coming in contact with the wheel. After the adjustment of the first pair of slides the wheel is turned slightly, so as to present a smaller diameter between the next slides, and so on repeatedly, whereby it permits the successive pair of slides to be moved increasing distances. The rotation of the wheel step by step for this purpose is secured by means of a ratchet-wheel, S, mounted on its axis and actuated by a pawl, T, carried by an arm on the axis of the lever N′, as plainly represented in Figs. 12 and 13.

For the purpose of restoring the wheel to its original position at the proper time, its shaft is connected with one end of a coiled spring, U, the opposite end of which is fastened to the supporting-head. To hold the wheel as it is turned step by step, and prevent it from turning backward until the proper time has arrived, a second pawl, V, is arranged to engage the ratchet-wheel, as shown in Fig. 13. After the completion of the operation the two pawls are automatically released by means of beveled studs, W, secured to the main frame, as seen in Fig. 10, in such position as to act upon and raise the two pawls when their carrying head L is moved to the left to its original position. A slot and pin, as in Fig. 12, serve to limit the rotation of the wheel R, which receives in no case more than half a revolution.

The movement of the slide-carrying frame I is effected at the will of the operator by means of a hand-lever, X, pivoted to the main frame and connected with the sliding frame by means of a link, Y, as shown in Fig. 7. In order that this lever may serve the additional purpose of throwing into gear the clutch by which the machine is driven, after the slides are in position I connect the link Y with the sliding frame I through the medium of a sliding block, *g*, which is pivoted to the link arranged to slide on the frame I, and connected with the latter by springs *h*. On moving the lever to the left the slide *g* and springs *h* remain inert and the frame I is moved to the left. When, however, the frame has reached its limit of movement, a continued pressure of the lever will overcome the springs and permit the lever to receive a continuing movement independent of the frame I, which remains in the meantime at rest. This continuing or secondary movement of the lever is rendered available for starting the machine by connecting to the lever a link or bar, *i*, the opposite end of which will be connected with the usual driving-clutch or other starting devices, which may be of the same construction as those in the original machine. After the slides have performed their function—carrying the space-bars to their operative positions—it is necessary to restore the slides to their original positions in their carrying-frame preparatory to their use in the justification of the next line. To this end I provide the slides each with a transverse notch, *k*, as shown in Figs. 5, 10, 11, and 14. In the frame directly over the place occupied by the slides when they are in their operative positions—I suspend two pivoted blades, *l l′*, extending transversely to the length of the slides, so that as the slides are moved laterally to place the space-bars in position their notched edges are carried beneath and into engagement with the lower edges of the blades *l l′*, as shown in Fig. 14. The blades are connected by arms *o o′*, jointed together, and at the proper time are caused to swing outward away from each other, each blade acting to move the corresponding row or series of slides outward to its original position, as indicated by the dotted lines in Fig. 14. In this way the slides are disengaged from the heads of the space-bars, so that the slide-carrying frame may be restored to its original position outside of the main frame. The opening action of the blades when they are released is secured by means of a spiral spring, *p*, as shown in Fig. 14. Their closing action is secured by means of a headed rod, *q*, extending from one of their arms, *o′*, upward loosely through an ear on the rising and falling head, *s*, by means of which the matrix-bars are lifted to their normal positions, as in the original machine, this head being the same as that lettered P in Patent No. 313,224. At the instant, therefore, that the matrix-bars complete their rising motion the head *s* acts through the rod *q*, to set the blades in position to engage the slides, which are immediately afterward brought into position beneath them by the movement of the frame I. When the descent of the head *s* and of the matrix-bars commences, the rod *q* is released, so that the spring may spread the blades. When the plates *l* are separated to retract the slides J, they carry the plates K upward in such position as to permit the slides to pass thereby as they are moved with the frame I.

For the purpose of forcing the space-bars upward after they have been distributed, I make use of a heavily-weighted lever, *t*, mounted in the main frame, and connected at one end by a link, *u*, or otherwise, with a vertically-sliding frame or yoke, *v*, lying beneath the space occupied by the space-bars when the latter are in an operative position, so that when the parts are released the lever will force the yoke upward against the lower ends of the space-bars, driving their tapered bodies upward between the matrix-bars, as before explained.

In order to relieve the space-bars from the action of the yoke and lever, to the end that they may descend at the proper time, I mount on the main shaft of the machine a cam, *w*, which acts on a stud or roller on the lever *t*. This cam will also serve to control the movement of the lever when elevating the yoke and space-bars, so as to prevent the shock and strain which would result from a sudden release of the lever.

For the purpose of drawing the space-bars downward with certainty at the proper time, I provide a weight, *x*, sliding in vertical guides extending downward from the main clamp $G^2$, or from any other suitable part of the machine. This weight bears upon and is lifted by shoulders or enlargements on the lower ends of the matrix-bars, so that it tends constantly to urge them downward. The weight *x* and the yoke *v* are both terminated at one side of the space which the group of type-bars occupied previous to the commencement of the operation, as shown in Fig. 9, in consequence of which the yoke and weight act only upon those space-bars which are carried over laterally to an operative position, those bars which are not called into use remaining at rest.

In order to insure the entrance of the adjusted or distributed space-bars at the proper points between the matrix-bars, I find it advantageous to lift the space-bars into engagement previous to the descent of the matrix-bars; but it is to be understood that this is not a necessary feature. This action is secured by giving the cam *w* such form that it will permit the yoke *v* to lift the space-bars slightly at the proper time, the bars being dropped again to their original positions before the matrix-bars complete their descent, in order that the latter may pass freely to their required positions. When the space-bars are lifted, the frictional engagement of their body portions with the heads causes the heads to be lifted, clear of the sustaining-rails H, so that the bars may move edgewise with the matrix-bars toward the face of the mold when the clamp G is brought into action against the rear edges. The rising motion of the heads, which is very slight, is limited by rods or equivalent stops, *y*, as shown in Fig. 6.

In order to lock the weighted lever and hold the yoke *v* positively in its depressed position during the time that it is not required for use, I pivot to the yoke a pawl, *z*, arranged to engage with a toothed bar, *a'*, extending downward from the main clamp G. As the yoke descends, this pawl slides over and engages with the toothed bar.

In order to release the pawl at the proper time, it is provided on one side with a pin, *b'*, which enters a vertical groove in the edge of the fixed bar *c'*, located adjacent thereto. When, therefore, the clamp is moved forward toward the matrix-bars previous to the completion of the casting operation, the bar *c'* disengages the pawl, leaving the yoke and weighted lever free to rise and actuate the space-bars.

As the attendant is liable to commit an error by striking the space-key and adjusting the slides J at an improper time, provision must be made for correcting such error. This provision consists simply of two inclined blocks, *d'*, attached to the guides or ways on which the slide-carrying frame I is moved, as plainly represented in Figs. 7, 10, and 11. If it be found that improper slides have been adjusted, the operator has only to throw the lever X to the right beyond its normal position, thereby moving the frame I to the right, and causing the inner ends of the slides J to be carried over the inclined faces of the blocks *d' d'*, which have the effect of forcing them all outward to their original positions, so that the operation may be commenced anew.

After the casting operation is completed and the matrix-bars elevated, it is necessary to restore the space-bars laterally to their original positions preparatory to the commencement of the next line. This is accomplished by means of horizontal rods *e'*, connected to a hand lever *f'*, on the left of the machine. When this lever is moved to the right, the rods push the space-bars before them to the normal position.

As shown in Figs. 6, 8, and 14, the blades *l l'* have their shafts or axes provided with upwardly extending arms *m m'*, carrying respectively at the upper ends parallel plates *n n'*, which extend transversely across opposite edges of the matrix-bars. The arms *m m'* are crossed, as shown, so that as the blades *l l'* are separated to retract the slides the plates *n n'* are approximated so as to bear edgewise on the matrix-bars and bring the latter in line, so that they may descend easily and without binding between the guide-rails H and between the mold and clamp. It is to be understood, however, that the plates *n n'* are not a necessary feature of the machine, and that they may be omitted or replaced by other devices having a like function.

It is to be particularly understood that in my machine the several space-bars are actuated positively and simultaneously, and to precisely the same extent, so that a uniformity of spacing in the line necessarily follows.

In this regard my construction is far superior to one in which the space-bars are caused or permitted to move independently.

Passing now to the second feature of the invention—the means for closing the mold—attention is directed to Figs. 6 and 7. As shown in Fig. 6, the mold consists, as in Patent No. 313,224 of two horizontally-movable sections, one overlying the other in such manner that they may be separated endwise to permit the delivery of the completed bar.

In operating the mold, it is found in practice that if its surfaces be fitted with sufficient closeness to prevent the leakage of the molten metal, they are liable to bind when expanded by the heat. To avoid this difficulty, I provide means whereby the two parts may be pressed together vertically when in operative position, but relieved from such pressure when the mold is to be opened. These pressure devices may be modified in form and arrangement; but I recommend as a simple and satisfactory means for the purpose a lever, $p'$, pivoted to the main frame or other suitable part of the machine, and arranged to act at one end on top of the mold, as plainly shown in Figs. 6 and 7, its opposite end being elevated at the proper time by a bar, $q'$, attached to the rear side of the rocking melting-pot $r'$, which is pivoted at $s'$, as in the original machine. A spring, $t'$, is attached to the under side of the lever to bear on the operating-arm, as shown in Fig. 6. When the pot tips forward to present its mouth against the mold, motion is transmitted through the spring to the lever, and thus the two parts of the mold forced tightly together.

Another feature of my invention relates to improvements in devices for adjusting the matrix-bars to bring the required characters in accurate alignment. In practice it has been found that after the stop devices have acted to align the characters it is desirable to make use of special mechanism to insure a very accurate adjustment of the aligned characters. For this purpose, I use, as in the original machine, an aligning device extending across the entire series of bars and entering notches in their rear edges; but instead of using a single blade, as in the original machine, I employ two co-operating blades, $u'$ and $v'$, lying horizontally in the main clamp, G, as plainly shown in Figs. 6, 7, 14, 24, and 25. The two blades are hinged together, and are movable forward and backward in the clamp, so that they may be projected beyond its face to enter the notches in the bars, as in Fig. 25, or retracted, as in Fig. 14, to permit free vertical movement of the bars. The forward and backward movement of the blades is effected by passing the lower blade, $u'$, loosely through a rock-shaft, $x'$, and connecting therewith springs $y'$, which urge the blade forward, and by a vertically-reciprocating bar, $z'$, which plays through a slot in the rock-shaft, and which has its upper end beveled to retract the blade. When the bar, $z'$ is depressed, the blades are thrown forward by the springs to engage the matrix-bars, but the elevation of $z'$ draws the blades out of engagement. The rock-shaft is provided, as shown in Figs. 8 and 24, with a depending arm, $x^2$, having in the lower end an inclined surface, $x^3$, acted upon at the proper time by the lever $x^4$, which operates one of the matrix-bar clamps C′ and one of the mold-sections, as in the original machine. As the lever $x^4$ closes the clamp and mold, it strikes the inclined surface $x^3$ and causes the rock-shaft to tip the forward edge of the plate $u'$ upward toward its companion $v'$, which latter is prevented from rising by reason of its solid bearing against the clamp G. As the two plates are engaged in different notches of the matrix-bars when thus closed together, it follows that they will clamp the intervening portions of the bars between them, thus bringing the notches, and consequently the characters on all the bars, into accurate alignment. The bar $z'$ for retracting the blades is pivotally connected to an operating arm, $a^2$, attached to the shaft of the lever $x^4$, before alluded to, whereby the blades are permitted to advance and engage the matrix-bars before they are closed together.

In practice it is usually desirable to adjust the machine for the casting of bars of uniform length. As the mold is susceptible of being closed to produce shorter bars, and as the mold-operating devices are connected with the driving devices, as in the original machine, by springs which tend to close the mold beyond the proper point, it is desirable to provide a positive means for stopping the clamps and the mold whenever they reach the predetermined position. This positive stoppage is advantageous in that it insures a line of proper length, and also in that it relieves the matrix-bars from the possibility of receiving lateral pressure, such as to prevent spacing-bars from being forced upward between them. While it is not absolutely necessary so to do, I prefer to advance the clamps toward the matrix-bars previous to the ascent of the spacing-bars, so that when the latter are elevated they will spread the matrix-bars firmly against the clamps, and in the accompanying drawings I have shown the parts constructed and timed to this end. The gage or clamp-arresting device which I prefer to employ is represented in Figs. 6, 7, 8, and 14. The laterally-acting clamp C is provided with a horizontal bar, $b^2$, seated in a slot therein and projecting beyond the same toward the opposite clamp a distance equal to the length of the required line, in such position that as the clamps are brought together to act on the matrix-bars and close the mold the end of the bar $b^2$ will strike the clamp C′ and thus limit the approximation of the two clamps. As shown in dotted lines in Fig. 9, the clamp C′ has in its forward end a vertical notch or opening, so that it may straddle the group of space-bars which have not been called into action, and reaching beyond them act against the type-bar at the end of the assembled or composed line, the construction of the jaw in this regard being very similar to that of the jaw D′ in Fig. 27, of my Patent No. 312,145, above referred to. It will be observed on reference to the drawings herein and particularly in Figs. 19 and 21 that the head of the space-bar is cut away in one edge, so as to reduce its width at this point below the width of the matrix-bar B. Thus it is that the notched end of the clamping jaw C is enabled to straddle the inactive space-bars, and reaching past them to act with clamping effect on the type-bars in action.

In order to admit of the clamps acting to confine the matrix-bars closely, should it happen from any reason that their aggregate width is insufficient to produce a line of full width, I connect the gage-bar $b^2$ to the clamp by means of a locking-pin, $c^2$, held in engagement by a spring, $d^2$, and on the rock-shaft which closes the clamp G, I pivot a trip-lever, $e^2$. As the clamp G completes its inward movement, the trip device acting against the beveled head of the pin $c^2$, lifts the same out of engagement, leaving the gage-bar free to yield.

The bars produced by this machine are used by assembling them in the order of their production, side by side, to constitute a solid form. I now provide the machine with automatic means for assembling the bars, as shown in Figs. 8 and 22. At one side of the frame I arrange an inclined table or galley, $g^2$, having a flange or rail at the lower edge. Above this table I fix a chute, $h^2$, usually of a single piece of sheet metal. The upper end of this chute lies immediately beneath the point at which the mold delivers the completed bar, and it is of such form as to allow the bar to fall sidewise thereon. Toward its lower end the chute is diminished in width and increased in height, its inner surface being given a spiral or twisting form, so that as the bars slide downward therein by gravity they are turned so as to present their printing-edges uppermost and delivered in this position endwise upon the galley. On the galley I place a reciprocating head or pressure device, $i^2$, actuated by a pitman, $j^2$, carried at one end by an eccentric or crank, $k^2$, secured to an extension of the main shaft. In advance of the pressure device I arrange a yielding head or support, $l^2$. As the bars descend in succession from the chute, they are forced forward one after another toward the support $l^2$, which is gradually advanced as the bars accumulate behind it. The head $i^2$ retreats at each movement a sufficient distance to permit the next bar to enter between it and the bar last added to the form.

Operation: The various parts stand normally in the positions shown in Fig. 8. The mold and the clamps being open, the matrix-bars are elevated, the space-bars assembled in a group at one side, and the aligning-plates retracted. The operator depresses in proper succession the keys designating the characters which are to appear in the line in precisely the same manner as in my original machine. The operation of the finger-keys is also followed by the lateral movement of the adjusting-pin frame step by step, in the original manner, and this in turn carries the head L, with its levers M and M′, to the right past the successive slides J. When, therefore, the space-key is operated, the corresponding slides, J, are thrust inward successively different distances, the motion being limited by wheel R. At the completion of the line the hand-lever X is operated and the frame, with adjusted slides therein, carried to the left, so that the slides take up and distribute the spacing-bars, at the same time engaging beneath the plates $l$ $l'$, which subsequently effect their retraction. The machine is now started. The space-bars rise slightly to enter between the matrix-bars, which latter then descend to their operative positions, the space-bars being at the same time dropped to their original places. The slides J are now retracted and disengaged from the space-bars and returned to their original positions outside of the frame by the movement of their carrying-frame. At or about this time the lateral clamps C C′ are closed to the proper places, their movement being limited by the gage-bar, and immediately thereafter, the space-bars ascend in unison, thus completing the justification of the line. The casting operation is now performed in the original manner, after which the clamps release the bars, the space-bars descend, the matrix-bars are elevated, and finally the space-bars moved to the right and grouped in their original positions.

While I prefer to have the slides J move horizontally to engage the heads of the matrix-bars, it is manifest that they would operate with the same effect if arranged to slide vertically, and this change may be made, if desired, the operating-levers and other parts being varied in position to correspond.

While I have shown my invention in connection with a machine having the reciprocating matrix-bars, it is to be understood that it is applicable in the same manner and with the same effect in a machine having disconnected dies and mechanism to assemble them in line, as represented in my Letters-Patent of the United States, dated May 12, 1885, No. 317,828, issued on an application filed on the 21st day of October, 1884, Serial No. 146,128.

In place of the weighted lever to advance the space-bars I may employ a lever operated, as in Fig. 26, by the controlling-cam, which will be grooved to receive a stud or roller on the side of the lever. When this device is used, the lever and space-bars will be moved in a positive manner. As the throw of the cam is invariable, but the distance to which the space-bars must be advanced is variable, I connect the lever with the head $v$ for lifting the space-bars by means of an intermediate rod and spiral spring, as shown in Fig. 26, or by other yielding connection the cam will impart to the lever a motion sufficient to carry the space-bars to the limit of movement required. In the event of their being required to move but a short distance they will wedge fast between the matrix-bars and cease their motion, whereupon the spring will yield to permit the continued motion of the lever and cam.

It is to be understood that whether the weight or the spring be employed to operate the space-bars they will exert sufficient force to advance the bars tightly to their places under the conditions encountered in practice, so that the bars are, in fact, operated with a positive motion.

I believe myself to be the first to operate a series of space-bars in unison, and to force them forward until they have spread a line of matrices or dies tightly between the confining-clamps or other confining-device; and it is to be distinctly understood that my invention is not limited to the precise details of construction to this end.

It will be apparent to the skilled mechanic that the same mode of action may be secured by devices the details of which may be variously constructed.

Having thus described my invention, what I claim is—

1. In a space-bar, the tapered head provided with supporting-shoulders at its upper end, in combination with the pendent sliding body tapered in the opposite direction, and provided at its lower end with the shoulders or enlargements to co-operate with lifting mechanism.

2. In an organized machine for producing type-surfaces or matrices therefor, the combination, substantially as described, of a line of matrices or dies, a series of independent space-bars mounted on rails or guides and movable thereon laterally across the entire field of the matrices that they may be brought opposite the desired point in the line of matrices, and also movable longitudinally that they may be thrust into the line between the matrices.

3. The expansible spacing-bar or quad consisting of the two tapered parts connected and arranged to slide one upon the other, one of said parts being provided with shoulders by which to suspend the bar, substantially as described and shown.

4. A line of matrices or dies, in combination with a series of tapered space-bars, and guide-rails adapted to permit the latter to be moved both laterally and longitudinally, whereby the bars may be first brought opposite the desired points in the lines, and then thrust between the matrices to spread or separate them.

5. In combination with a line of matrices, adjacent guides extending lengthwise of and beyond the line of matrices, and a series of tapered space-bars suspended freely upon and between the guides, whereby the space-bars are permitted to pass beyond the field occupied by the matrices, or to be inserted between the matrices at any desired point or points in the line.

6. In combination with the pendent matrix-bars having a rising and falling motion, the guide-rails H, lying beneath and extending beyond the bars in position to admit the latter between them, and the two-part space-bars suspended upon and between the rails, as described and shown.

7. The pendent vertically-moving matrix-bars, in combination with the rail H, the two-part space-bars suspended on said rails, and stops $y$, to limit the rising motion of the heads of the bars while permitting their body portions to be thrust forward between the matrices.

8. A line of matrices or dies, and clamps or stop devices to limit the lateral separation of the matrices, in combination with a series of tapered space-bars to effect the separation of the matrices, a weight, and a pressure-head connected to said weight, and arranged to advance the space-bars simultaneously between the matrices, whereby the line of matrices is automatically expanded to the limit permitted by the clamps.

9. The combination, substantially as shown and described, of a series of matrices or dies, the series of space-bars, and the laterally-movable frame I, provided with adjustable slides J to effect the distribution of the space-bars.

10. The series of space-bars differing in width, in combination with the sliding frame I, the slides J in said frame to distribute the space-bars, the laterally-movable head L, provided with devices to adjust the slides, J, and the finger-key connected by devices, substantially as described, with said adjusting devices, whereby the operation of the finger-key is caused to effect the adjustment of the slides.

11. In combination with the slides J and the adjusting-levers M M′, the eccentric wheel R, operating in connection therewith to limit the movement of the slides, whereby the successive bars or slides are adjusted to engage the successive space-bars.

12. In combination with the laterally-movable space-bars, the sliding frame I, its slides J, adjustable to engage the successive space-bars, and the inclined plates K, by which the slides are forced inward after the engagement with the space-bars, whereby the space-bars are locked between the slides and prevented from turning or twisting.

13. In combination with the distributing-slides J, mounted in frame I, the inclined blocks $d$ $d'$, whereby all the slides may be restored to their normal positions for the correction of errors.

14. The combination of a line of matrices or dies, automatic clamps movable into and out of position to limit the expansion of the matrix-line, an operating device common to the series of space-bars, and mechanism, substantially as described, for actuating the same subsequent to the adjustment of the clamp.

15. The combination, substantially as shown, of a line of matrices or dies, a series of space-bars arranged in a single line, guides or rails whereby said bars are sustained, and whereon they are movable laterally within or beyond the field of the matrices, and a pressure device, D, adapted to engage only those space-bars which are brought for the time being within the field of the matrices, whereby those space-bars which are not called into use are permitted to remain at rest unaffected by the pressure device.

16. The combination of rails or guides, a series of matrices or dies, and a series of tapered space-bars provided with suspending shoulders and arranged to hang upon the rails between the matrices, their lower ends projecting below the matrices that they may be acted upon by a pressure device thereunder.

17. In an automatic machine for producing type surfaces or matrix-impressions therefor, the combination of a series of dies or matrices adapted to be assembled in line, clamps to confine the line of dies and limit its elongation, operating mechanism, substantially as described, acting to advance said clamps to their operative positions and to retract them clear of the matrices, and automatic mechanism, substantially as described, acting to advance the space-bars while the clamps are in operative position.

18. In combination with the eccentric wheel R, mounted on the movable head, the spring to turn the same in a backward direction, the ratchet-wheel and pawls to effect its forward rotation, and the studs for automatically releasing the pawls, whereby the wheel is permitted to resume its original position.

19. In combination with the movable space-bars, the frame I and its slides J for distributing the space-bars, the movable blades *l l'*, whereby the slides are retracted and disengaged from the space-bars.

20. In an organized machine substantially such as herein described, the blades *l l'* for effecting the retraction of the slides J, in combination with the spring to operate said blades, and the rod *q*, connecting the blades with the head *s*, by which the matrix-bars are lifted, whereby the slides J are automatically disconnected from the space-bars as the matrix-bars commence their descent between the space-bars.

21. In combination with the slides J for distributing the space-bars, the blades *l l'* to effect the retraction of the slides, and the plates *n n'*, connected with the blades and arranged to guide the matrix-bars in their descent.

22. The series of longitudinally-movable space-bars in combination with the pressure-head *v*, the weighted lever to actuate said head, and the ratchet mechanism to lock said head in its depressed position.

23. In combination with the matrix-bars, the space-bars, and the lifting-head for the space-bars actuated by a weight, the ratchet mechanism to lock the head in its depressed position, and an arm, *c''*, to disconnect the ratchet mechanism, whereby the pressure head is automatically released at the proper time to actuate the space-bars.

24. The combination of the space-bars, the pressure head acting thereon, the weighted lever to actuate the head, and the cam to control the movement of said lever.

25. In combination with matrix-bars, finger-keys, and intermediate stop mechanism, embracing an adjusting-pin frame movable step by step, as set forth in Patent No. 313,224, a series of laterally-movable space-bars, the laterally-movable frame provided with adjustable slides to distribute the space-bars a slide-adjusting mechanism, substantially as described, partaking of the movement of the adjusting-pin frame, and a finger-key connected with said slide-adjusting mechanism, substantially as described, whereby the operation of said finger-key is caused to adjust the appropriate slides for placing a space-bar opposite the required point in the line of matrices.

26. In combination with a series of aligned matrices or type, a series of independent tapered space-bars arranged for motion in the direction of their length, mechanism, substantially as described, for distributing said space-bars adjacent to the matrices, and mechanism, substantially as described, for restoring the space-bars laterally to their original positions.

27. In combination with the matrix-bars and the laterally-confining clamps C C', the gage-bar $B^2$, acting to limit the approximation of the clamps.

28. In combination with the matrices or dies and the lateral clamps C C', the gage-bar $b^2$, the locking device $c^2$, connecting said bar with the clamp, and the trip device $e^2$, whereby the locking device is automatically disengaged to release the gage-bar when required.

29. The divided separable mold, combined with the pressure lever, and a movable melting-pot arranged to operate said lever.

30. The divided separable mold, in combination with the yielding device *p'*.

31. In combination with the matrix-bars having notches therein, the clamp G, and the aligning device consisting of the two blades movable to and from each other, and also movable forward and backward with respect to the clamp and matrix-bars.

32. The notched matrix-bars, in combination with the two aligning blades hinged together, the rock-shaft wherein one of said blades is movable, the mechanism for rocking said shaft, and the mechanism for effecting the forward and backward movements of the blades.

33. In combination with the aligning blades hinged together as described, the rock-shaft provided with a depending arm, the clamp-operating lever $x^4$, to actuate said arm, the springs to advance the blades, and the beveled bar $z'$ to effect their retraction, said bar also connected, as described, with the lever $x^4$.

34. The lever X, connected with the starting-clutch, in combination with the sliding frame I and the spring-connection between said frame and lever, whereby the lever is enabled to first move the frame and subsequently operate the clutch to effect the starting of the machine.

35. In a mechanism for casting bars bearing a plurality of characters, the combination of a mold to receive molten or like material, a series of independently-movable matrices adapted for presentation to said mold, and a series of spacing devices adapted for application to the mold between the characters for the two-fold purpose of maintaining their separation and of closing the mold between them to prevent the escape of the metal therefrom.

36. In a machine for casting type-bars, and in combination with the mold for said bars, a series of independent matrices adapted for alignment in front of and against the mold, and a series of expansible spacing devices, substantially as described, adapted to serve the two-fold purpose of maintaining the separation between the matrices and of closing the face of the mold.

37. In combination with a mold and a series of independent matrices adapted for presentation in series to the mold, the adjustable spacing devices, each consisting of two wedge-like parts constructed and arranged to present to the mold smooth unbroken surfaces above the level of the characters in the matrices, whereby they are adapted to maintain the separation of the matrices, to prevent the escape of metal from the mold, and to form depressions in the resulting cast between its characters or words.

In testimony whereof I have hereunto set my hand, this 2d day of August, 1892, in the presence of two attesting witnesses.

OTT. MERGENTHALER.

Witnesses:
PH. H. HOFFMAN,
JAMES C. KUHN.